United States Patent
Liu et al.

(10) Patent No.: US 8,741,747 B2
(45) Date of Patent: Jun. 3, 2014

(54) METHOD FOR PROCESSING A GLASS SUBSTRATE

(75) Inventors: Xuanjie Liu, Shanghai (CN); Herb Huang, Shanghai (CN); Guoan Liu, Shanghai (CN)

(73) Assignee: Semiconductor Manufacturing International (Shanghai) Corporation, Shanghai (CN)

(*) Notice: Subject to any disclaimer, the term of this patent is extended or adjusted under 35 U.S.C. 154(b) by 322 days.

(21) Appl. No.: 13/171,749

(22) Filed: Jun. 29, 2011

(65) Prior Publication Data

US 2012/0171835 A1 Jul. 5, 2012

(30) Foreign Application Priority Data

Dec. 31, 2010 (CN) .......................... 2010 1 0620462

(51) Int. Cl.
*H01L 21/20* (2006.01)
*C03C 17/22* (2006.01)

(52) U.S. Cl.
CPC ........... *C03C 17/22* (2013.01); *C03C 2218/355* (2013.01); *C03C 2217/282* (2013.01)
USPC ...................... 438/479; 437/764; 257/E21.09

(58) Field of Classification Search
USPC .................. 438/479, 758, 759, 764
See application file for complete search history.

(56) References Cited

U.S. PATENT DOCUMENTS

| 5,587,325 A * | 12/1996 | Comeau ........................ 438/471 |
| 7,989,324 B2 * | 8/2011 | Shimokawa ................... 438/479 |
| 8,404,563 B2 * | 3/2013 | Hanaoka ....................... 438/458 |
| 2006/0094241 A1 * | 5/2006 | Park et al. ..................... 438/689 |
| 2006/0102975 A1 * | 5/2006 | Nakamura et al. ............ 257/435 |
| 2009/0085174 A1 * | 4/2009 | Noda et al. .................... 257/636 |

FOREIGN PATENT DOCUMENTS

CN 101533890 A 9/2009

* cited by examiner

*Primary Examiner* — Savitr Mulpuri
(74) *Attorney, Agent, or Firm* — Anova Law Group, PLLC

(57) ABSTRACT

A method for processing a glass substrate is disclosed. A glass substrate including a first surface, a second surface, and a side surface between the first surface and the second surface is provided. An opaque conductive layer is formed on the second surface and a part of the side surface close to the second surface. Thereafter, a semiconductor process is performed on the first surface. Thereafter, the opaque conductive layer on the second surface and the part of the side surface close to the second surface is removed. The problem of transporting a transparent glass substrate by some semiconductor tools is solved without increasing tool cost by enabling the sensing and transportation of glass substrates with optical sensor and/or electrical chuck. The fabrication of devices with a glass substrate is also achieved.

12 Claims, 2 Drawing Sheets

METHOD FOR PROCESSING A GLASS SUBSTRATE

CROSS-REFERENCES TO RELATED APPLICATIONS

The present application claims the priority of Chinese Patent Application No. 201010620462.5, entitled "Method for Processing a Glass Substrate", and filed on Dec. 31, 2010, the entire disclosure of which is incorporated herein by reference.

BACKGROUND

1. Field of the Invention

The present invention relates generally to semiconductor technology, and more particularly to a method for processing a glass substrate.

2. Description of Prior Art

Recently, Resistance Random Access Memory (RRAM) has been recently studied as a next generation non-volatile memory because of its characteristics, such as simple structure, low power, high-speed, and compatibility with modern semiconductor CMOS processing. During the research of RRAM materials, researchers have found multiple material systems that may be used for RRAM. Those multiple material systems may include rare $MnSiO_x$ materials, transition perovskite-type materials, binary transition metal oxides, organic macromolecular semiconductor materials, and some sulfide materials. Currently, the research on binary transition metal oxides mainly includes NiO, TiOx, CuxO, Cu—$MoO_x$, ZnO, Mg—ZnO, Co—Zno, Mn—ZnO, $Fe_2O_3$, $ZrO_2$, and the like.

Since binary transition metal oxides generally have a large optical energy gap >3eV, they have good transmittance in the visible light range. Therefore, if a transparent electrode substrate is selected for their manufacture, it would be possible to achieve the fabrication of a transparent RRAM storage unit, which could also be integrated to optically transmissive electronic devices for the future. This transparent RRAM device would not be a substitute for the current semiconductor-based electrode devices, but may provide a new concept and trend for future optically transmissive electronic devices that may be widely used in the field of transparent electronic devices.

The fabrication of RRAM, including binary transition metal oxides, may require a transparent glass substrate. On the substrate, a sandwich of electrode layer/binary transition metal oxide layer/electrode layers is fabricated, forming a part of the structure of a RRAM storage unit. The electrode layer has high conductivity (or resistivity in the range of $10^{-5} \sim 10^{-4}$ $\Omega/cm$). The binary transition metal oxide layer possesses resistance transformation characteristics, which are useful for memory storage, and also possesses high transmittance for visible light.

The glass substrate in RRAM is transparent and non-conductive. However, current substrate transport hardware in some semiconductor tools may properly work with only opaque or conductive semiconductor substrates. Therefore, current substrate transport hardware in some semiconductor tools may not recognize glass substrates nor transport them properly between process chambers to perform processes like litho, thin film, diffusion, and etching. Therefore, there is a need to solve the fabrication difficulties for RRAM with a glass substrate.

BRIEF SUMMARY

The present invention relates generally to semiconductor technology. More specifically, some embodiments of the present invention relate to a method for processing a glass substrate.

According to one embodiment of the present invention, a method for processing a glass substrate, includes the following steps. A glass substrate including a first surface, a second surface, and a side surface between the first surface and the second surface is provided. An opaque conductive layer is formed on the second surface and a part of the side surface close to the second surface. Thereafter, a semiconductor process is performed on the first surface. Thereafter, the opaque conductive layer on the second surface and the part of the side surface close to the second surface is removed.

According to one specific embodiment, opaque conductive layer is a semiconductor material and the semiconductor material is poly Si or doped poly Si. According to another specific embodiment, the poly Si is made by a furnace, a sensor of a transportation tool of the furnace is a mechanical sensor, and a chuck of the transportation tool is a mechanical chuck. According to another specific embodiment, when fabricating the poly Si, a temperature of the furnace is below 500° C. According to another specific embodiment, an impurity for doping the poly Si is phosphorus, fluorine, boron or arsenic, and the doped poly Si is made by an in-situ doping process.

According to another specific embodiment, a thickness of the opaque conductive layer is 0.3 to 1.3 times a thickness of the glass substrate. According to another specific embodiment, a thickness of the opaque conductive layer on the part of the side surface close to the second surface is 0.1 to 0.7 times a thickness of the glass substrate. According to another specific embodiment, the method for processing a glass substrate further includes removing the conductive layer by a wet-etching process including a mixed solution of orthophosphoric acid, acetic acid and nitric acid.

A better understanding of the nature and advantages of the embodiments of the present invention may be gained with reference to the following detailed description and the accompanying drawings.

DETAILED DESCRIPTION

Figure 1:
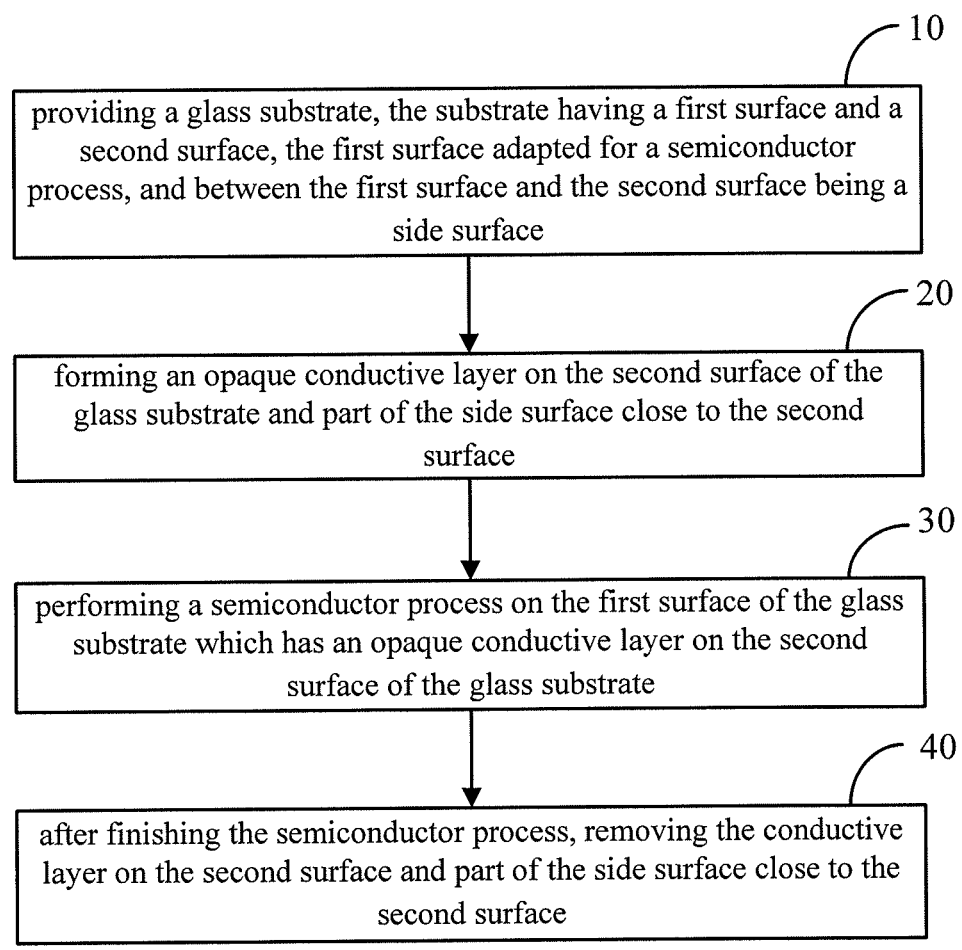
FIG. 1 is a flow chart showing the sequence for processing a glass substrate, in accordance with an embodiment of the present invention.

The glass substrate used in RRAM is transparent and non-conductive. However, some current substrate transport hardware in some semiconductor tools may only work properly with opaque or conductive semiconductor substrates. Therefore, current substrate transport hardware in some semiconductor tools may not recognize glass substrates nor transport them properly between process chambers to perform processes like litho, thin film, diffusion, and etching. Therefore, there is a need to solve the fabrication difficulties for RRAM with a glass substrate.

To further explain the aforementioned issue, the operation of substrate transport by current transport hardware in semiconductor tools is described next. Specifically, the substrate is generally put in a cassette and the cassette is put in a wafer buffer of the semiconductor tool. The transport hardware of the semiconductor tool fetches the substrate from the cassette and puts the substrate in the process chamber of the semiconductor tool. After finishing the processing, the transport hardware puts the substrate back into the former position of the substrate in the cassette. The transport hardware of a semiconductor tool includes a sensor, a chuck and a mechanical robot. The sensor is used to ascertain the location of the substrate. After the confirmation of the substrate location, the chuck moves to the corresponding location, takes the substrate out, and transports the substrate to the process chamber under the action of the mechanical robot. Chucks may be divided into two types: mechanical chucks and electrical chucks (also called E-chucks). Since a mechanical chuck uses friction force to hold the substrate, the mechanical chuck can hold any substrate including transparent substrates, opaque substrates, conductive substrates, and insulating substrates. However, since the E-chuck utilizes static electric force to hold the substrate, the E-chuck may be used to hold conductive substrates but not insulating substrates such as glass substrates.

The sensors include optical sensors and mechanical sensors. The optical sensor takes advantages of optical signals to scan the substrate and ascertain the location of the substrate in the cassette by the reflected optical signal. Because the substrate location is confirmed by the reflected optical signal, the optical sensor can only scan and recognize opaque substrates. However, a glass substrate is difficult to scan and be recognized by the optical sensor. The mechanical sensor generally utilizes the sensor configured in the mechanical chuck to sense the substrate. Thus, the mechanical sensor can be used for sensing many kinds of substrates including transparent substrates, opaque substrates, conductive substrates, and insulating substrates.

In current semiconductor tools, the transport hardware vary for different processes on the semiconductor substrate. Some semiconductor tools, such as the furnace for poly Si deposition, can sense and transport many kinds of substrates comprising transparent substrates, opaque substrates, conductive substrates and insulating substrates since those semiconductor tools utilize mechanical sensors, mechanical chucks and mechanical robots as part of the transport hardware. Therefore, those semiconductor tools can be used to perform semiconductor processing for glass substrates. However, some other semiconductor tools (such as physical vapor deposition, sputtering tools, and ion implantation tools for the deposition of conductive layers) can not be used to hold glass substrates since those tools take advantages of optical sensors or electrical chucks, which makes the processing of glass substrates difficult for these tools.

The inventors considered retrofitting the transport hardware of the semiconductor tools in the manufacturing line to make the tools capable of handling glass substrates. The retrofits include replacing optical sensors with mechanical sensors and changing electrical chucks to mechanical chucks. However, those retrofits involve multiple semiconductor tools and are costly.

To resolve the aforementioned issues, according to the embodiments of the present invention, a method is described for processing a glass substrate. More particularly, without changing current substrate transport hardware in semiconductor tools, glass substrates can be recognized by the substrate transport hardware in semiconductor tools. Also, without increasing the cost of the semiconductor tools, semiconductor processing is achieved for glass substrates.

FIG. 1 is a flow chart showing the sequence for processing a glass substrate, in accordance with an embodiment of the present invention, which includes the following steps. A glass substrate may be provided 10. The glass substrate may include a first surface, a second surface, and a side surface between the first surface and the second surface. The first surface may be adapted for a semiconductor process in subsequent steps. An opaque conductive layer may be formed 20 on the second surface and on a part of the side surface close to the second surface. Next, a semiconductor process may be performed 30 on the first surface of the glass substrate, after the formation of the opaque conductive layer on the second surface and on the part of the side surface close to the second surface. After finishing the semiconductor process, the conductive layer on the second surface and the part of the side surface close to the second surface is removed 40.

Figure 2:
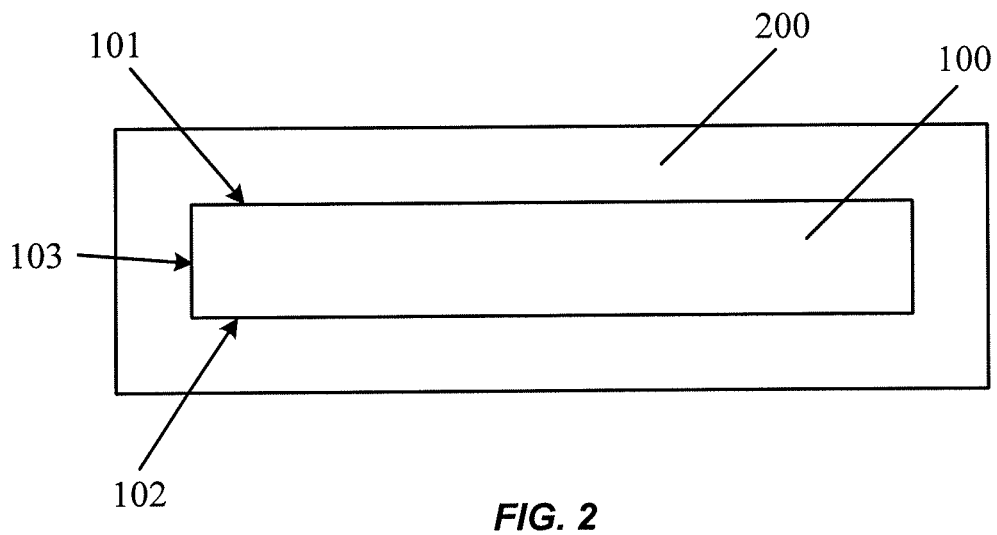
FIG. 2 is a schematic cross-sectional side view of a glass substrate following formation of an opaque conductive layer on the glass substrate in accordance with an embodiment of the present invention.

FIG. 2 is a schematic cross-sectional side view of a glass substrate 100 following formation of an opaque conductive layer 200 on the glass substrate in accordance with an embodiment of the present invention. Substrate 100 may have a first surface 101 and a second surface 102. The first surface 101 may be adapted for semiconductor processing. Between first surface 101 and second surface 102 may be a side surface 103. The semiconductor processing may include, for example, litho, thin film, or diffusion. Semiconductor processing may be conducted on a variety of semiconductor tools including a variety of transport mechanisms. Opaque conductive layer 200 is formed surrounding first surface 101, second surface 102 and side surface 103 of glass substrate 100. The opaque conductive layer 200 may enable the glass substrate to be held by an electrical chuck and sensed by an optical sensor. Thus, the opaque conductive layer may enable the glass wafer to be compatible with various kinds of processes on many varieties of semiconductor tools with many more types of transport mechanisms than were possible without the opaque conductive layer.

In an embodiment, the conductive layer may be poly Si. The poly Si may be made by a furnace. Because the furnace's transport hardware includes a mechanical sensor and a mechanical chuck, glass substrate 100 may be transported by the furnace tool, which enables formation of conductive layer 200 on first surface 101, second surface 102 and the side part in between first surface 101 and second surface 102 of glass substrate 100. To avoid the melting of glass substrate 100 during formation of the poly Si, the temperature of the furnace should not be too high. The temperature should be below 500 degrees.

In another embodiment of the invention, conductive layer 200 may be doped poly Si. The impurities for doping the poly Si may be phosphorus, fluorine, boron, or arsenic. The doped poly Si may be made by an in-situ doping process. The in-situ doping is performed in the furnace. The transport hardware of the furnace includes the mechanical sensor and the mechanical chuck, therefore, the transport hardware of the furnace may be used to transport glass substrate 100, which may utilize the furnace to form opaque conductive layer 200. To avoid the melting of glass substrate 100 during the formation of the poly Si, the temperature of the furnace should not be too high. The temperature should be below 500 degrees. The conductivity of the doped poly Si is higher than that without doping, which has the benefit of increasing the holding force of the electrical chuck when holding glass substrate 100.

Figure 3:
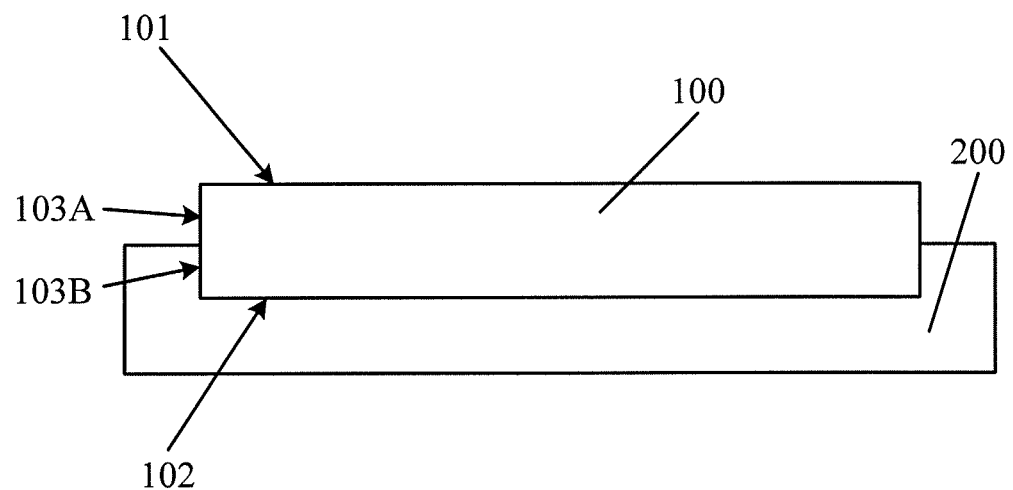
FIG. 3 is a schematic cross-sectional side view of the glass substrate following removal of the opaque conductive layer from the first surface of the glass substrate and the part of the side surface close to the first surface in accordance with an embodiment of the present invention.

FIG. 3 is a schematic cross-sectional side view of glass substrate 100 following removal of opaque conductive layer 200 from first surface 101 of the glass substrate and a part of side surface 103A close to first surface 101 in accordance with an embodiment of the present invention. A part of the opaque conductive layer may be removed with a plasma dry etching process or a single-sided wet etching process. Another part of opaque conductive layer 200 on second surface 102 and on part of side surface 103B near the second surface 102 may continue to remain on glass substrate 200. The thickness of opaque conductive layer 200 formed over second surface 102 may be 0.3 to 1.3 times a thickness of the glass substrate 100, and may preferably be 0.3 to 0.7 times the thickness of the glass substrate 100 so as to ensure the glass substrate 200 may be properly sensed by the optical sensor. The thickness of opaque conductive layer 200 formed over part of side surface 103B near the second surface 102 may be 0.1 to 0.7 times the thickness of glass substrate 100, and may preferably be 0.2 to 0.5 times the thickness of the glass substrate 100 to ensure the holding stability and reliability of glass substrate 100 on the electrical chuck.

After the formation of opaque conductive layer 200 on the glass substrate as shown in FIG. 3, the semiconductor tools may conduct various semiconductor processes generally over or in first surface 101 of glass substrate 100 which has opaque conductive layer 200 on second surface 102 of glass substrate 100. The semiconductor processes may include litho, etching, thin film, or diffusion processes, each of which may have corresponding semiconductor tools. Because of opaque conductive layer 200 on second surface 102 and on part of side surface 103B near second surface 102 of glass substrate 100, glass substrate 100 may be held by many kinds of chucks including electrical or mechanical chucks and sensed by many kinds of sensors including optical or mechanical sensors of the transport hardware for the semiconductor tools, which ensures compatibility of semiconductor processes performed on various kinds of semiconductor tools on glass substrate 100.

The semiconductor processes conducted on first surface 101 of glass substrate 100 may be similar to currently known technologies. Those skilled in the art may design specific configurations on the glass substrate 100 depending on the device to be formed. For example, RRAM may be made on glass substrate 100. The semiconductor processes known by those skilled in the art, are not described in detail herein.

Figure 4:
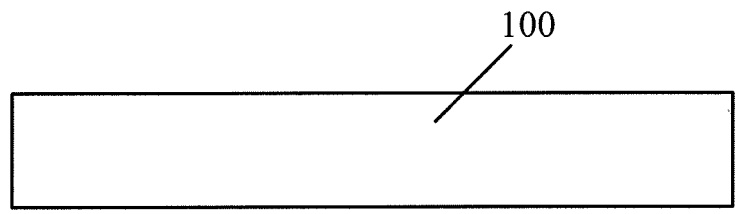
FIG. 4 is a schematic cross-sectional side view of a glass substrate following removal of the opaque conductive layer on the second surface and the part of the side surface close to the second surface in accordance with an embodiment of the present invention.

FIG. 4 is a schematic cross-sectional side view of glass substrate 100 following removal of opaque conductive layer 200 on second surface 102 and the part of side surface 103B close to the second surface in accordance with an embodiment of the present invention. After finishing the semiconductor process, the remaining opaque conductive layer on the second surface 102 and on the side surface 103B of the glass substrate 100, are removed. The method for removal of the remaining opaque conductive layer may be a wet-etching process. The wet-etching process may be performed with a mixed solution of orthophosphoric acid, acetic acid, and nitric acid.

In summary, an opaque conductive layer may be formed on the second surface of the glass substrate and part of the side close to the second surface. Because of the opaque conductive layer, the glass substrate may be held by electric chuck and sensed by optical sensor. Thus, the glass substrate may be successfully transported by semiconductor tools configured with optical sensor and/or electric chuck as part of their transport hardware. Also, various processes may be performed on glass substrates as they are on semiconductor substrates. Since there is no need to retrofit the transport hardware in semiconductor tools, the embodiments described herein enable performing the semiconductor processes for glass substrates without increasing the cost of the semiconductor tools.

Further preferably, the opaque conductive layer may be semiconductor material rather than metal. The semiconductor material may be poly Si or doped poly Si, which reduces metal contamination for the glass substrate in comparison to techniques with metal and avoids the diffusion of metal ions into the glass substrate, which may deteriorate the performance of the final fabricated device.

Embodiments of the present invention provide a method for fabricating devices on a glass substrate. The embodiments of the present invention are not limited by the number or type of semiconductor processes that are used on the first surface of the glass substrate. It will be apparent to those with skill in the art that modifications to the above methods and apparatuses may occur without deviating from the scope of the present invention. Accordingly, the disclosures and descriptions herein are intended to be illustrative, but not limiting, of the scope of the invention, which is set forth in the following claims along with their full scope of equivalents.

What is claimed is:

1. A method for processing a glass substrate, comprising:
providing a glass substrate including a first surface, a second surface, and a side surface between the first surface and the second surface;
forming an opaque conductive layer material surrounding the first surface, the second surface, and the side surface of the glass substrate;
removing a first portion of the opaque conductive layer material from the first surface of the glass substrate and from a first part of the side surface close to first surface, such that a second portion of the opaque conductive layer material remaining on the second surface and on the part of the side surface close to the second surface of glass substrate forms an opaque conductive layer, wherein the opaque conductive layer is made of a semiconductor material comprising a poly Si or a doped poly Si and the opaque conductive layer enables the glass substrate to be held by a chuck including an electrical chuck and to be sensed by a sensor including an optical sensor using a semiconductor tool including a transport mechanism;
performing a semiconductor process on the first surface of the glass substrate including the opaque conductive layer on the second surface and the part of the side surface close to the second surface, wherein the semiconductor process includes a lithographic process, a thin film process, a diffusion process, or a combination thereof, and is conducted using a semiconductor tool including a transport mechanism; and
removing the opaque conductive layer on the second surface and the part of the side surface close to the second surface after the semiconductor process is performed on the first surface of the glass substrate.

2. The method for processing a glass substrate according to claim 1, wherein the poly Si is made by a furnace, a sensor of a transportation tool of the furnace is a mechanical sensor, and a chuck of the transportation tool is a mechanical chuck.

3. The method for processing a glass substrate according to claim 2, wherein when fabricating the poly Si, a temperature of the furnace is below 500° C.

4. The method for processing a glass substrate according to claim 1, wherein an impurity for doping the poly Si is phosphorus, fluorine, boron or arsenic, and the doped poly Si is made by an in-situ doping process.

5. The method for processing a glass substrate according to claim 1, wherein a thickness of the opaque conductive layer on the second surface of the glass substrate is 0.3 to 1.3 times a thickness of the glass substrate.

6. The method for processing a glass substrate according to claim 1, wherein a thickness of the opaque conductive layer on the part of the side surface close to the second surface of the glass substrate is 0.1 to 0.7 times a thickness of the glass substrate.

7. The method for processing a glass substrate according to claim 1, further comprising removing the conductive layer by a wet-etching process including a mixed solution of orthophosphoric acid, acetic acid and nitric acid.

8. The method for processing a glass substrate according to claim 1, wherein the chuck further includes a mechanical chuck and the sensor further includes a mechanical sensor.

9. The method for processing a glass substrate according to claim 4, wherein the poly Si is doped to provide a conductivity to increase a holding force of an electrical chuck for holding the glass substrate.

10. The method for processing a glass substrate according to claim 5, wherein the thickness of the opaque conductive layer on the second surface of the glass substrate is 0.3 to 0.7 times the thickness of the glass substrate such that the glass substrate is sensed by an optical sensor.

11. The method for processing a glass substrate according to claim 6, wherein the thickness of the opaque conductive layer on the part of the side surface close to the second surface of the glass substrate is 0.2 to 0.5 times the thickness of the glass substrate to ensure a holding stability and reliability of the glass substrate on an electrical chuck.

12. The method for processing a glass substrate according to claim 1, wherein the glass substrate including the opaque conductive layer is different from a glass substrate that does not include the opaque conductive layer, and wherein the glass substrate that does not include the opaque conductive layer is not able to be processed by a semiconductor tool including a transport mechanism.

* * * * *